Dec. 9, 1969  W. E. PARKINS  3,483,040
NUCLEAR BATTERY INCLUDING PHOTOCELL MEANS
Filed June 27, 1966
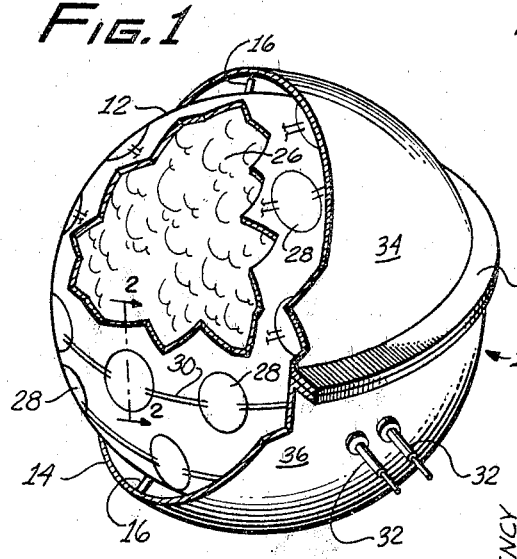
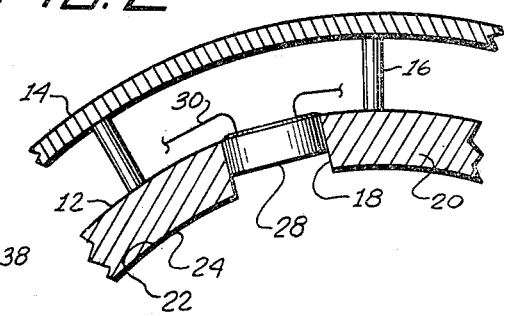
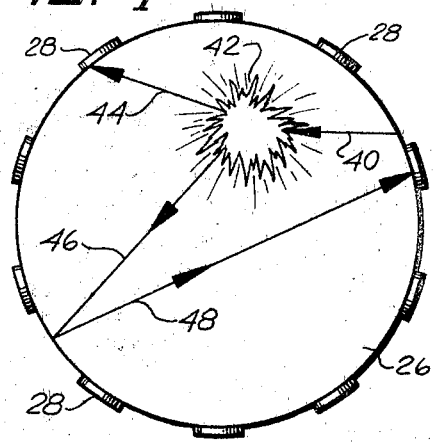
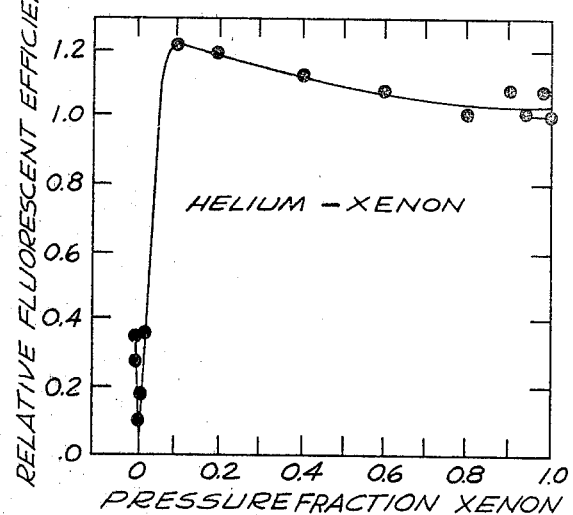
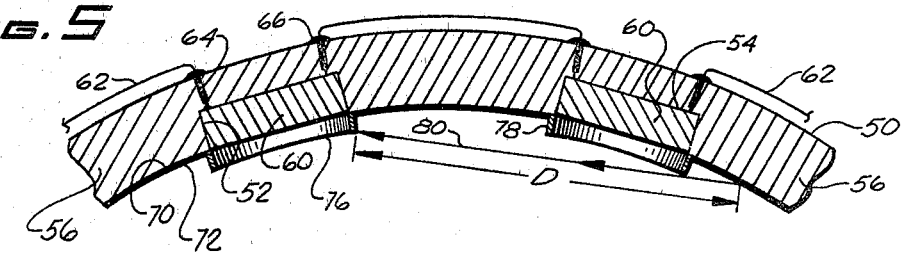
INVENTOR.
WILLIAM E. PARKINS
BY
Donald Ellingsberg

United States Patent Office 3,483,040
Patented Dec. 9, 1969

3,483,040
NUCLEAR BATTERY INCLUDING
PHOTOCELL MEANS
William E. Parkins, Woodland Hills, Calif., assignor to
North American Rockwell Corporation
Filed June 27, 1966, Ser. No. 560,470
Int. Cl. H01m 15/02
U.S. Cl. 136—89                     12 Claims

ABSTRACT OF THE DISCLOSURE

A nuclear battery or electrical power supply using a radioactive source whose radiation is converted to electromagnetic radiation by a fluorescent gas, which is then converted to electrical energy in photocells such as photoelectric or photovoltaic cells.

Background of the invention

One type of nuclear battery is a double-conversion nuclear battery. A double-conversion nuclear battery converts radiation that is emitted as particles from a radioactive energy source into electromagnetic radiation and then converts the electromagnetic radiation into electrical energy in a photocell. In the double-conversion nuclear batteries of the prior art (for example, see U.S. Patents Nos. 3,031,519; 3,037,067; and 3,053,927) a phosphor, either solid or liquid, converts the radiation particles into electromagnetic radiation, usually as scintillations of visible light. One or more photoelectric cells then convert the electromagnetic radiation to electrical power for an external load.

Double-conversion nuclear batteries have a relatively short operating life because the solid or liquid phosphor experiences radiation damage from the high velocity radiation particles.

Objects of the invention

Accordingly, it is an object of my invention to provide a new and improved nuclear battery.

Another object of the invention is to provide a lightweight and compact double-conversion nuclear battery having a relatively long operating life with an electrical power output at a useful value.

A further object of the invention is to provide a double-conversion nuclear battery having an improved geometry to prevent radiation damage to the battery.

Likewise an object of the invention is to provide a double-conversion nuclear battery having an improved geometry for increased efficiency.

An additional object of the invention is to provide a double-conversion nuclear battery that has inherent voltage regulation.

Still another object of the invention is to provide a double-conversion nuclear battery that requires no special radiation shielding.

Summary of the invention

Briefly, in accordance with the invention, a new and improved nuclear battery is provided having a container means, a suitable radioactive energy source positioned within the container, and a fluorescent gas atmosphere in the container that converts the kinetic energy of radioactive particles emitted from the radio-active source into electromagnetic radiation. A photocell positioned in the container and protected from the radioactive particles converts the electromagnetic radiation to electrical energy.

In one embodiment of the invention, alpha particles are emitted from a relatively thin film of a radioactive material positioned on the inner surface of a container such as a perforated sphere or shell. The kinetic energy of the emitted alpha particles is converted into electromagnetic energy by a fluorescent gas that occupies the volume defined by the sphere. Electromagnetic radiation from the fluorescent gas is then incident on one or more photocells that are suitably positioned to cooperate with the perforations of the sphere. An outer sphere can be used to enclose the perforated sphere.

Further objects, features, and the attending advantages of the invention will be apparent when the following description is read in connection with the accompanying drawing.

Brief description of the drawing

FIGURE 1 is a perspective view, partly broken away, of a double-conversion nuclear battery of the invention;

FIGURE 2 is an enlarged section of the nuclear battery of FIGURE 1 along the line 2—2.

FIGURE 3 is a graphical relationship of the pressure fraction of one fluorescent gas and the relative fluorescent efficiency of the gas;

FIGURE 4 is a schematic representation of the operating principle of the double-conversion nuclear battery of the invention; and FIGURE 5 is an enlarged section of a modification of the double-conversion nuclear battery of the invention.

Description of the invention

Referring to FIGURES 1 and 2, one form of double-conversion nuclear battery 10 is shown. The nuclear battery 10 has a container means which, in the form shown, is an inner sphere 12 positioned within an outer sphere 14. The inner and outer spheres 12 and 14 are maintained in a spaced-apart relationship by a plurality of similar spacers such as rods 16. The rods 16 are circumferentially distributed so that the inner sphere 12 is positioned within and supported by the outer sphere 14. The inner sphere 12 is suitably formed with a plurality of similar apertures 18 and connecting ligaments 20, i.e., formed as a perforated sphere.

A radioactive source means is positioned within the container means, preferably the inner sphere 12. The radioactive energy source in the nuclear battery 10 of FIGURES 1 and 2 is preferably an alpha particle emitter, as will be described hereinafter. The radioactive source is positioned as a relatively thin layer or coating 24 on the inner surface 22, i.e., the inner surface of the connecting ligaments 20, of the perforated inner sphere 12. It is desirable for an efficient nuclear battery 10 that the radioactive layer 24 have a mirror-like surface finish; however, the surface finish is not critical to the invention.

In the complete nuclear battery 10, the inner sphere 12 defines a spherical volume 26 that contains a fluorescent gas. The fluorescent gas is preferably hermetically sealed within at least the outer sphere 14.

A converter means, such as similar photocells 28, are preferably positioned in the apertures 18. The photocells 28 are electrically connected by similar electrical leads 30. The photocells 28 can be electrically connected either in series, in parallel, or in series-parallel strings with the electrical power output from the complete nuclear battery 10, for example, brought through similar hermetically sealed and electrically insulated output leads 32.

It is contemplated that the inner sphere 12, for example, can be formed from several segments which are suitably joined, and that the outer sphere can be formed as shown by FIGURE 1 from separate hemispheres 34 and 36 that are joined at a conventional flange joint 38.

The following example is given as an indication of one nuclear battery formed in accordance with the invention as described and as shown by FIGURES 1 and 2. This example is offered to assure a working understanding of the invention and is not to be interpreted as limiting the scope of my invention.

| Spherical volume | Approximately 16 in.³ |
|---|---|
| Radius (sphere) | Approximately 1.5 in. (3.8 cm.). |
| Weight | Approximately 1 lb. |
| Package | Hermetically sealed container. |
| Radioactive material | Plutonium-238; approximately 1.6 grams. |
| Fluorescent gas | Xenon. |
| Output | 5 volts DC across a $4.5 \times 10^4$ ohm load. |
| External radiation | Less than 200 mr./hr. at the external surface of the package. |

Plutonium-238 has the following average alpha emission characteristics:

| Energy | 5.9 (mev.) or $9.43 \times 10^{-3}$ watts-sec.$^{-1}$. |
|---|---|
| Range (in air) | 1.8 inches (4.5 centimeters). |
| Decay constant | $2.54 \times 10^{-10}$ sec.$^{-1}$. |
| Half-life | 86.4 (years) or $2.65 \times 10^9$ seconds. |

The radioactive source of alpha particles, plutonium-238, is deposited as a layer 24 on the inner surface 22 of the perforated inner sphere 12. The layer 24 of plutonium-238 has a reflective surface. The layer 24 of plutonium-238 cooperates with the container means to substantially eliminate external radiation from the nuclear battery 10.

The fluorescent gas used in the nuclear battery 10 as shown by FIGURES 1 and 2 is preferably xenon and is present at least within the spherical volume 26. It is contemplated that the volume defined by the space between the inner sphere 12 and outer sphere 14 would also be filled with xenon.

Xenon is known as an efficient scintillation material, i.e., fluorescent when exposed to radioactive energy such as the high energy alpha particles that are emitted from the radioactive layer 24. The number of ion pairs produced in xenon through ionizing events is a linear function of the alpha particle energy. For each mev. (million electron volts) expended by alpha particles in xenon gas, 570 kev. (thousand electron volts) will produce approximately $3.7 \times 10^4$ ion pairs. The remaining 430 kev. goes into excitation of ions and atoms. Since the xenon converts the kinetic energy of the alpha-particles into electromagnetic radiation, some fraction of the energy expended in the production of ion pairs and excitations is converted into useful energy in the form of electromagnetic radiation which can be at visible or near visible frequencies.

It is contemplated that conventional wave shifter techniques can be used when necessary to shift the wave length of the fluorescent gas toward the optimum spectral response of the particular converter means used in the nuclear battery of the invention. The wave shifter techniques are desirable to maximize the electrical power output of the nuclear battery by matching the spectral sensitivity of the photocells used in the nuclear battery.

Helium atoms are formed in the xenon by the alpha particles emitted from the plutonium-238 into the fluorescent gas. The resulting helium buildup in the xenon gas in the form of nuclear battery shown by FIGURES 1 and 2 is at a gradual rate of approximately one atmosphere for every five years. However, this helium buildup is beneficial. The fluorescent characteristics of xenon improve from 100% to about 120% as the gas mixture gradually changes from 100% xenon to 20% xenon-80% helium. The fluorescent characteristics of the xenon-helium gas mixture then drop sharply to zero (see FIGURE 3).

The photocells used in the nuclear battery as converter means are conventional and can be any one of several well-known types of photoelectric or photovoltaic cells; for example, selenium photovoltaic cells, and the like.

Operatively, FIGURE 4 schematically shows the nuclear battery of the invention. When the radioactive energy source is a layer on the inner surface of the sphere (see FIGURE 2), an alpha particle emitted from the layer describes a straight-line path 40 into the fluorescent gas that is contained in the spherical volume 26. The alpha particle interacts with the gas and the kinetic energy of the alpha particle is converted in an ionizing event into a scintillation or flash 42 of electromagnetic radiation. Electromagnetic radiation from the flash 42 passes either directly to a photocell 28 after describing path 44, or indirectly after describing path 46 to the surface of the layer where it is reflected and then describes path 48 to a photocell. All the electromagnetic radiation paths from the flash 42 are not shown by FIGURE 4 for purposes of clarity. While only one flash 42 is shown by FIGURE 4 for purposes of clarity, it is to be understood that multiple flashes occur in the fluorescent gas.

Referring to FIGURE 5, one modification of the nuclear battery of the invention has a single sphere 50 that is preferably hermetically sealed with a fluorescent gas atmosphere contained therein. The single sphere 50 is suitably formed with a plurality of similar and spaced-apart recesses, such as recesses 52 and 54, with interconnected or joined land regions 56. Conventional photovoltaic cells 60 are shown positioned in each of the recesses 52 and 54, and electrically connected by similar electrical leads 62 that are brought through similar lead apertures 64 formed in the wall of the sphere 50. Each of the lead apertures 64 is hermetically sealed by a suitable potting material 66. It is contemplated that the electrical leads can be positioned within the single sphere. A radioactive source material is positioned on the inner surface 70, i.e., the inner surface of the land region 56, of the sphere 50 as a layer or coating 72.

The nuclear battery shown by FIGURE 5 is similar in operation to the nuclear battery 10 shown by FIGURES 1 and 2, and also as schematically shown by FIGURE 4.

It is known that the conventional photovoltaic cells used in the nuclear battery of the invention, particularly the form of nuclear battery as shown by FIGURE 5, will, when unprotected, experience radiation damage from approximately 4 kev. or greater energies of alpha particles that strike the cells. Alpha particle radiation from plutonium-238 has an energy of 5.9 mev. which is substantially in excess of the 4 kev. limit. However, alpha particles emitted from plutonium-238 have a range in air at standard conditions of approximately 1.8 inches (4.5 centimeters). Therefore, a photovoltaic cell that is positioned diametrically opposite to a point of alpha particle emission from the plutonium-238 source can be protected by the geometry of the battery container. When the volume defined by the container is filled with a xenon-helium mixture at a suitable pressure, the distance between the emission point and the photovoltaic cell should be at least greater than the range of the alpha particles in the xenon-helium mixture at a given pressure.

The photocells adjacent to a point of alpha particle emission from the plutonium-238 source, however, must be protected. In the nuclear battery shown by FIGURES 1 and 2, the photocells 28 are recessed within the apertures 18 below the inner surface 24 so that the alpha particles emitted from points adjacent the photocells do not strike the cells. In the nuclear battery shown by FIGURE 5, barrier means such as barrier rims 76 and 78 are positioned around each of the photovoltaic cells 60 and extend above the inner surface 70. It is contemplated that similar barrier means can be positioned around each of the photocells 28 in the nuclear battery shown by FIGURES 1 and 2. An alpha particle emitted from a point on the radioactive layer 72 describes a straight-line path 80 and hits the barrier rim 78. Therefore, the rim prevents the alpha particle from damaging the photovoltaic cell 60. The straight-line path 80 is illustrated as a maximum distance D that is approximately equal to the range of alpha particles in air. Any alpha particles emitted from the radioactive layer at a distance that is greater than the dimension D will not damage the photovoltaic cells since they will have an energy level less than 4 kev. It is contemplated that the photocells can have an added transparent surface (not shown) such as a quartz-glass window which is conventional.

A nuclear battery formed in accordance with the invention maintains a substantially constant electrical power output with inherent voltage regulation because conventional photovoltaic cells have a constant output voltage. Because of the inherent voltage regulation provided by the photovoltaic cells, increased efficiency in the fluorescent gas will not adversely affect the electrical voltage output but will become an additional source of reserve power.

As will be evidenced from the foregoing description, certain aspects of the invention are not limited to the particular details of construction as illustrated and it is contemplated that other modifications and applications will occur to those having skill in the art. It is, therefore, intended that the appended claims shall cover such modifications and applications that do not depart from the true spirit and scope of the invention.

I claim:
1. A nuclear battery comprising:
    (a) a hermetically sealed container means including a first shell means having an internal surface defining a plurality of spaced-apart portions and interconnecting lands,
    (b) a radioactive source positioned on said interconnecting lands of said internal surface, said radioactive source emitting radioactive energy,
    (c) a fluorescent gas means within said container means, said gas means converting a portion of said radioactive energy to electromagnetic radiation, and
    (d) a plurality of photocell means cooperating with said container means, said spaced-apart portions of said internal surface suitably formed to receive and position respective ones of said photocell means in associated ones of said spaced-apart portions, said photocell means converting a portion of said electromagnetic radiation to electrical energy.
2. The nuclear battery of claim 1 in which said radioactive source is an alpha particle emitter.
3. The nuclear battery of claim 1 in which said radioactive source has a reflective surface finish.
4. The nuclear battery of claim 1 in which said fluorescent gas means is xenon.
5. The nuclear battery of claim 1 in which said photocell means are photovoltaic cells.
6. The nuclear battery of claim 1 in which said photocell means are photoelectric cells.
7. The nuclear battery of claim 1 in which said container means includes a second shell means enclosing said first shell means.
8. The nuclear battery of claim 1 in which said spaced-apart portions are apertures and said photocell means are recessed into said apertures below said internal surface.
9. The nuclear battery of claim 1 in which said first shell means is a sphere having a diameter greater than the range of said radioactive energy in said fluorescent gas means so that said radioactive energy emitted by said radioactive source diametrically opposed to said photocell means is dissipated prior to impinging on said opposite photocell means thereby substantially eliminating radioactive energy damage to said photocell means.
10. The nuclear battery of claim 9 in which said container means includes a barrier means cooperating with said photocell means so that radioactive energy damage between adjacent photocell means is substantially eliminated.
11. The nuclear battery of claim 10 in which said barrier means is a rim means extending above said internal surface and about said photocell means.
12. The nuclear battery of claim 10 in which said spaced-apart portions are recesses.

References Cited

UNITED STATES PATENTS

| | | |
|---|---|---|
| 2,598,925 | 6/1952 | Linder. |
| 2,858,459 | 10/1958 | Schwarz. |
| 3,037,067 | 5/1962 | Bartolomei _____ 136—89 |
| 3,053,927 | 9/1962 | Viszlocky _____ 136—89 |
| 3,361,866 | 1/1968 | Babigan _____ 310—3 X |

ALLEN B. CURTIS, Primary Examiner

U.S. Cl. X.R.

310—3